United States Patent
Hyman

(10) Patent No.: US 8,356,031 B2
(45) Date of Patent: Jan. 15, 2013

(54) SYSTEM AND METHOD OF GENERATING A PLAYLIST BASED ON A FREQUENCY RATIO

(75) Inventor: David Hyman, Kensington, CA (US)

(73) Assignee: Daisy, LLC, Santa Monica, CA (US)

( * ) Notice: Subject to any disclaimer, the term of this patent is extended or adjusted under 35 U.S.C. 154(b) by 308 days.

(21) Appl. No.: 12/703,801

(22) Filed: Feb. 11, 2010

(65) Prior Publication Data

US 2011/0196867 A1    Aug. 11, 2011

(51) Int. Cl.
   *G06F 17/30*    (2006.01)
(52) U.S. Cl. .................................... 707/728; 707/916
(58) Field of Classification Search .............. 707/728, 707/916
   See application file for complete search history.

(56) References Cited

U.S. PATENT DOCUMENTS

| | | | |
|---|---|---|---|
| 5,616,876 A * | 4/1997 | Cluts | 84/609 |
| 2002/0138630 A1 * | 9/2002 | Solomon et al. | 709/228 |
| 2002/0198909 A1 * | 12/2002 | Huynh et al. | 707/513 |
| 2004/0002310 A1 * | 1/2004 | Herley et al. | 455/179.1 |
| 2004/0158860 A1 * | 8/2004 | Crow | 725/46 |
| 2005/0175030 A1 * | 8/2005 | Moon et al. | 370/465 |
| 2009/0063971 A1 * | 3/2009 | White et al. | 715/716 |
| 2010/0251305 A1 * | 9/2010 | Kimble et al. | 725/46 |
| 2011/0078323 A1 * | 3/2011 | Wooden | 709/231 |

OTHER PUBLICATIONS

Kum et al., Metadata Retrieval Using RTCP for Multimedia Streaming, 2008.*
Griffin, Introducing the Slider control, May 17, 2007 accessed Feb. 8, 2012.*

* cited by examiner

*Primary Examiner* — William Spieler
(74) *Attorney, Agent, or Firm* — Raj Abhyanker, P.C.

(57) ABSTRACT

Several methods and systems to generate a playlist based on a frequency ratio are disclosed. In one aspect a method includes, presenting a list of a seed data to a user of a music device, selecting a portion of the seed data based on a preference of a user, and determining an identity of a primary song based on a match between the primary song and the preference of the user. The method also includes providing the user streaming access to the primary song in a database and determining a secondary song based on the primary song. A correlation between the secondary song and the primary song is determined based on an algorithm and the user is provided streaming access to the secondary song. A frequency ratio of the primary song and the secondary song is automatically adjusted in responsive to a selection through a selection tool.

20 Claims, 12 Drawing Sheets

| SEED 502 | PRIMARY DATABASE 504 | SECONDARY DATABASE 506 | ARTIST NAME 508 | FREQUENCY 510 |
|---|---|---|---|---|
| FIRST PRIMARY SONG | X154 | X15J | JOHN DOE | 60% |
| SECOND PRIMARY SONG | X156 | X16J | JOHN DOE | 50% |
| FIRST SECONDARY SONG | X158 | X17J | JANE ROE | 40% |
| ••• | ••• | ••• | ••• | ••• |

TABLE 550

FIGURE 5

SYSTEM AND METHOD OF GENERATING A PLAYLIST BASED ON A FREQUENCY RATIO

FIELD OF TECHNOLOGY

This disclosure relates generally to an enterprise method, a technical field of communication, and in one example embodiment, to a system and method of generating a playlist based on a frequency ratio.

BACKGROUND

A user (e.g., a music fan) may enjoy a work of authorship of a particular type (e.g., of a particular artist, of a particular album, of a particular song, etc.). The user may purchase a media content of the particular type (e.g., an individual song or an album) through a service (e.g., Apple® iTunes, etc.). Additionally a user may purchase a subscription service (Napster®, Rhapsody®, etc.) and/or access a streaming music service (e.g. Pandora®, etc.).

The service may charge a monthly subscription fee to the user to download and/or access the media content. The service may need to collect revenues to pay an artist, intermediaries, and/or employees of the service. The service may not allow unlimited access to the media content without charging the user a consideration (e.g., monthly fee, per unit download fee, subscription fee, etc.) to access the media content.

The service may limit access to the particular type of work of authorship of interest to the user (e.g., a user may not be able to listen to an entire album of a particular musical artist or multiple songs by the same artist). In addition, the service may not account for the preferences of the user regarding access to works of authorship related to a particular work of authorship. As a result, the user may have limited control over access to works of authorship (e.g., streaming music).

SUMMARY

Several methods and a system to a system and method of generating a playlist based on a frequency ratio are disclosed. In one embodiment a method includes, presenting a list of a seed data to a user of a music device, selecting a portion of the seed data based on a preference of a user, and determining an identity of a primary song based on a match between the primary song and the preference of the user. The method also includes providing the user streaming access to the primary song in a database and determining a secondary song based on the primary song. A secondary artist of the secondary song is different than a primary artist of the primary song. A correlation between the secondary song and the primary song is determined based on an algorithm. The secondary song is identified as being similar to the primary song based on the algorithm. The user is provided streaming access to the secondary song when the secondary song is selected from the database in a playlist having the primary song. A frequency ratio of the primary song and the secondary song is automatically adjusted in responsive to a selection through a selection tool. The playlist is generated through a processor based on the frequency ratio of the primary song and the secondary song. In addition, the method includes providing access to the primary song and the secondary song similar to the primary song based on the preference of the user.

In another embodiment, a method includes, providing streaming access to a first primary song to a user of a music device and determining an identity of a second primary song. A primary artist of the first primary song is the same as the primary artist the second primary song. The method also includes providing the user streaming access to the second primary song in a database, and determining a secondary song based on the first primary song. A secondary artist of the secondary song is different than the primary artist of the first primary song. A correlation between the secondary song and the first primary song is determined based on an algorithm. The secondary song is identified as being similar to the first primary song based on the algorithm. The method also includes providing the user streaming access to the secondary song when the secondary song is selected from the database in a playlist having the first primary song. A frequency ratio of a primary song and the secondary song is automatically adjusted responsive to a selection through a selection tool. The playlist is generated through a processor based on the frequency ratio of the primary song and the secondary song. Access to the primary song and the secondary song similar to the primary song is provided.

In yet another embodiment, a system includes a processor to generate a playlist based on a frequency ratio of a primary song and a secondary song based on a selection tool to provide a user of the selection tool streaming access to the playlist based on the frequency ratio selected by the user. The system also includes, a selection tool including an axis to provide the user to select the frequency ratio of the primary song and the secondary song based on sliding of a slider to a desired point along the axis. In addition, the system includes a database of the primary song and the secondary song to provide the user streaming access to the secondary song similar to the primary song. A primary artist of the primary song is the same as the seed artist of a seed data. A secondary artist of the secondary song is different than the primary artist of the primary song.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying Drawings and from the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIG. 5 is a table view illustrating frequency of a seed in a playlist, according to one embodiment.

Other features of the present embodiments will be apparent from the accompanying Drawings and from the Detailed Description that follows.

DETAILED DESCRIPTION

Several methods and a system to artist frequency slider indicator and method are disclosed. Although the embodiments have been described with reference to specific example embodiments, it will be evident that various modifications and changes may be made to these embodiments without departing from the broader spirit and scope of the various embodiments.

Figure 1:
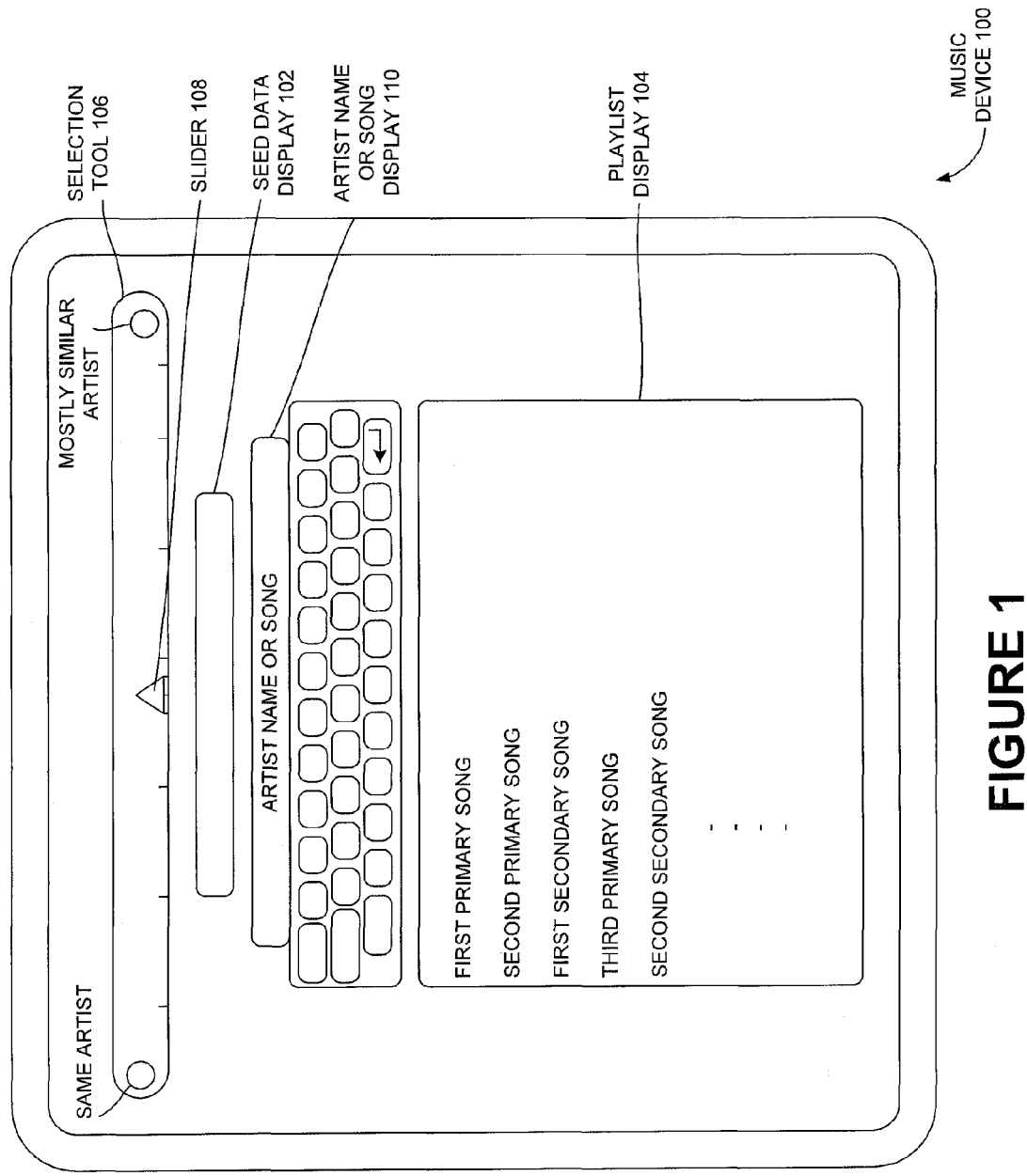
FIG. 1 is a system view illustrating a music device, according to one embodiment.

FIG. 1 is a system view illustrating a music device, according to one embodiment.

In one or more embodiments, a music device 100 may be used to select and play the songs based on a selection criterion. The songs may be selected based on a seed data provided to the user. The seed data may include a seed artist, a seed album, seed song, etc. For example, the songs may be selected based on a particular artist, a genre, type of music, time frame, etc. In an alternative embodiment, the music device 100 may be embedded in a mobile device, an automobile, a television, etc.

In another embodiment, a user may enter a seed data through a user interface (e.g., a user interface 208 as illustrated in FIG. 2) of the music device 100. The input seed data may be displayed on a seed data display 102. The artist or song may be displayed on the artist or song display 110. Once the seed (e.g., artist and/or song) is entered the user may be allowed to slide a slider 108 along the axis of a selection tool 106. A frequency for blending of a primary song and a secondary song may be chosen by sliding the slider 108 along a vertical, diagonal, and/or a horizontal axis on the selection tool 106.

When a user inputs a seed data, a client module (e.g., client module 210 of FIG. 2) of the music device 100 may send a request to a music server (e.g., music server 204 of FIG. 2) for a song of the input seed type. Based on the frequency ratio and the input seed data, the music server may provide a playlist 104 to the music device 100. The playlist 104 may include a primary song and a secondary song blended according to a frequency ratio selected by the user.

The frequency ratio (e.g., a frequency ratio 402 of FIG. 2) may be evaluated by a selection tool module (e.g., a selection tool module 232 of FIG. 2) based on the position of the slider 108 on the selection tool 106. For example, when the slider 108 is near the centre of the selection tool 106 a playlist including equal number of primary songs and secondary songs may be generated. When the slider 108 is at the starting position on the axis of the selection tool 106, a playlist constituting more of primary songs (e.g., 90% primary songs) and less secondary songs (e.g., 10% secondary songs) may be generated. In yet another embodiment, the playlist 104 displayed on the music device 100 may be displayed as a list of songs to be displayed as a fading gradient of colors from a foreground color to a background color, thereby creating an illusion that the playlist may be infinite.

In several embodiments a slider 108 may be used to adjust a frequency ratio of the primary songs and the secondary songs. In one embodiment, if the slider 106 is placed at one end of the selection tool 106 the playlist 104 may be composed of 100% primary songs, where all of the songs on the playlist 104 may be by the same artist. In another embodiment, if the slider 106 is placed at the other end of the selection tool 106 the playlist 104 may be composed of mostly secondary songs, but not 100% secondary songs, and some primary songs may be a part of the playlist 104, even when the slider 108 is at the other end of the selection tool 106.

In a preferred embodiment, a slider 108 may be a preferred selection tool 106 to adjust a frequency ratio. A slider may be preferred over a knob, because for a user a slider may be easier to adjust than a knob. A user that is travelling (e.g. running or driving a car) may have an easier time to visually locate and adjust a slider rather than rotate a knob.

Figure 2A:
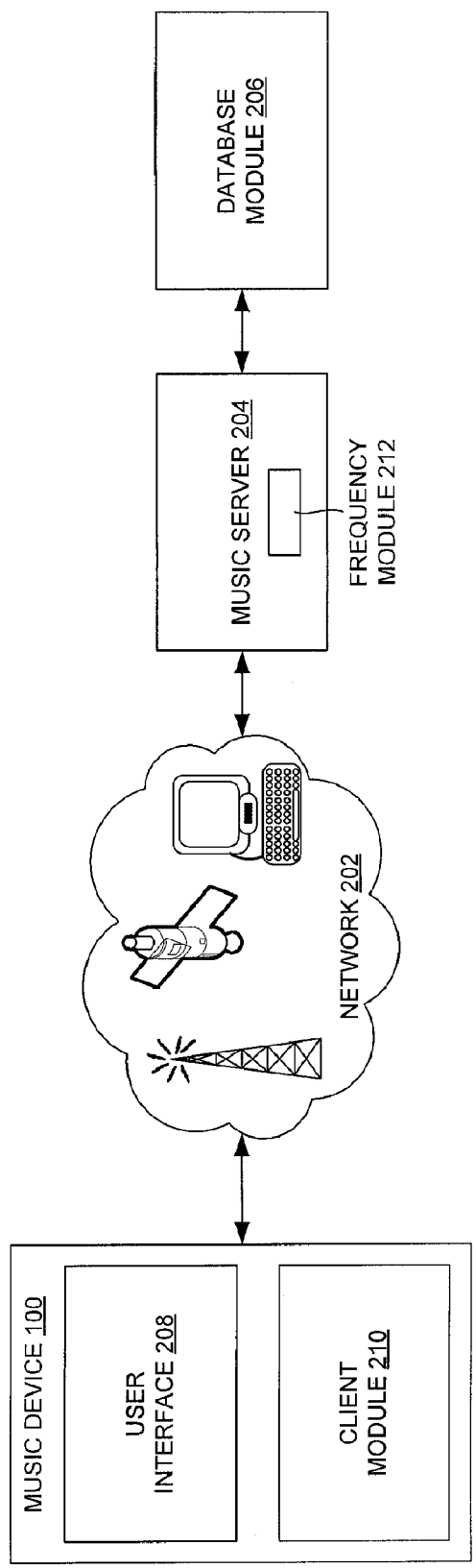
FIG. 2A is a system view illustrating communication between a music device and a music sever through a network, according to one embodiment.

FIG. 2A is a system view illustrating communication between a music device and a music sever through a network, according to one embodiment.

In one embodiment, a user may request for songs through a user interface 208 of the music device 100. A song may be selected from a list of seed data presented to the user. A client module 210 of the music device may communicate the user's request to a music server 204 through a network 202. The network 202 may include LAN, internet, satellite communication network, etc.

The music server 204 may process the user's request and fetch the songs from a database module 206. The music server 204 may also include a frequency module 212 which may evaluate the frequency ratio based on the position of the slider 108 on the selection tool 106. The database module 206 may include a master repository of songs and artists. Further, the music server 204 may provide the songs obtained from the database module 206 to the music device 100 through the network 202.

Figure 2B:
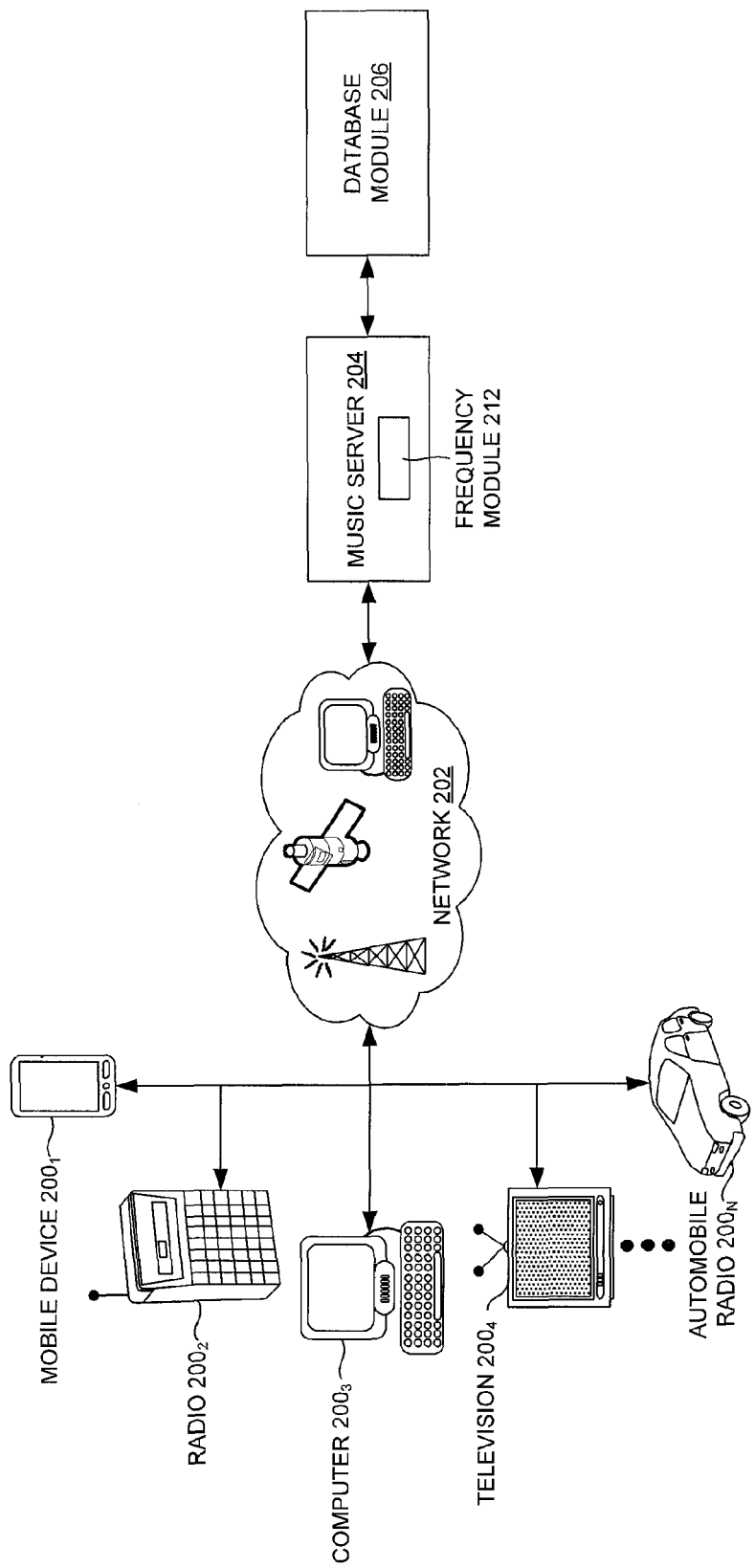
FIG. 2B is a system view illustrating communication between various music devices and the music server, according one embodiment.

FIG. 2B is a system view illustrating communication between various music devices and the music server, according one embodiment.

In one embodiment, a user may request for songs through a music device. For example, the music device may be a mobile device $200_1$, a radio device $200_2$, a computer $200_3$, a television $200_4$, an automobile radio $200_N$, etc. The music devices (e.g., a mobile device $200_1$, a radio device $200_2$, a computer $200_3$, a television $200_4$, an automobile radio $200_N$, etc.) may communicate to the music server 204 through the network 202.

In another embodiment, a song may be selected from a list of seed data presented to the user. For example, the seed data may be a seed artist, a seed album and/or a seed song. The user may select a song based on an artist, genre, type of music, etc. The music server 204 may process the user's request and fetch the songs from the database module 206. The frequency module 212 of the music server 204 may evaluate the frequency ratio based on the position of the slider 108 on the selection tool 106. The database module 206 may include a master repository of songs and artists. The music server 204 may provide the songs obtained from the database module 206 to the music device 100 through the network 202.

Figure 2C:
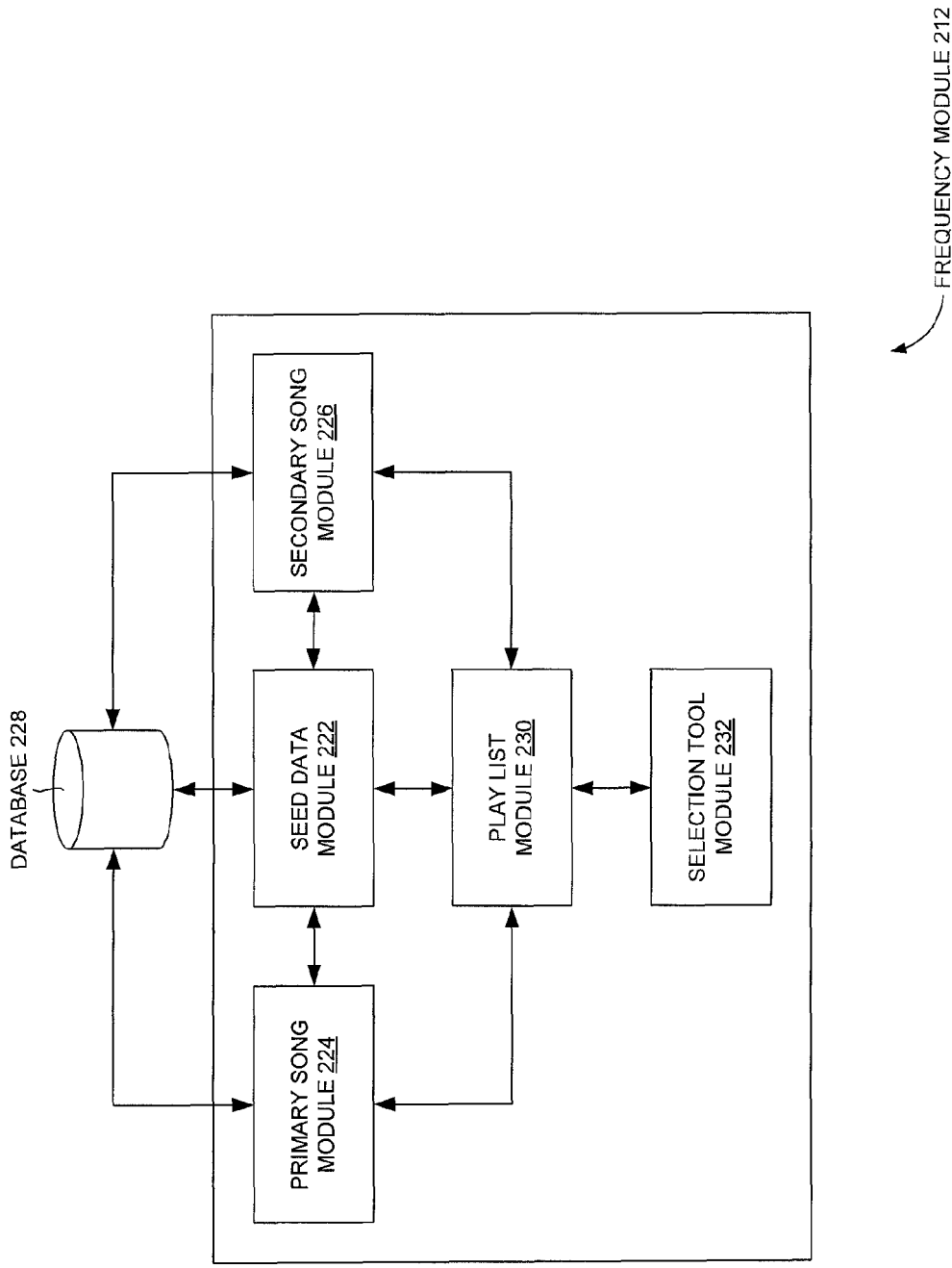
FIG. 2C is an exploded view of the frequency module illustrated in FIG. 2A, according to one embodiment.

FIG. 2C is an exploded view of the frequency module illustrated in FIG. 2A, according to one embodiment.

In one embodiment, the frequency module 212 may include a seed data module 222, a primary song module 224, a secondary song module 226, a playlist module 230 and a selection tool module 232. The frequency module 212 may communicate to a database 228 which may include a list of seed data. For example, the seed data may include songs of an artist, songs related to a genre, tone, etc. Whenever a user inputs a seed data, the input seed data may be stored in the seed data module 222. Based on the users seed data a primary song may be identified in the database 228. The identified primary song may be stored in the primary song module 224. Based on the primary song and the input frequency ratio a secondary song similar to the primary song may be determined through an algorithm. The secondary song may be identified in the database 228 and stored in the secondary song module 226.

In response to a selection of a frequency on the selection tool 106, the selection tool module 232 may evaluate the frequency ratio based on the position of the slider 108 on the axis of the selection tool 106. The evaluated frequency ratio may be provided to the playlist module 230. The playlist module 230 may access the primary song from the primary song module 224 and secondary song from the secondary song module 226. Further, the playlist module 230 may blend the primary songs and secondary song according to the input frequency ratio and generate a playlist. The generated playlist (e.g., the playlist 104) may be displayed on the music device 100.

Figure 3A:
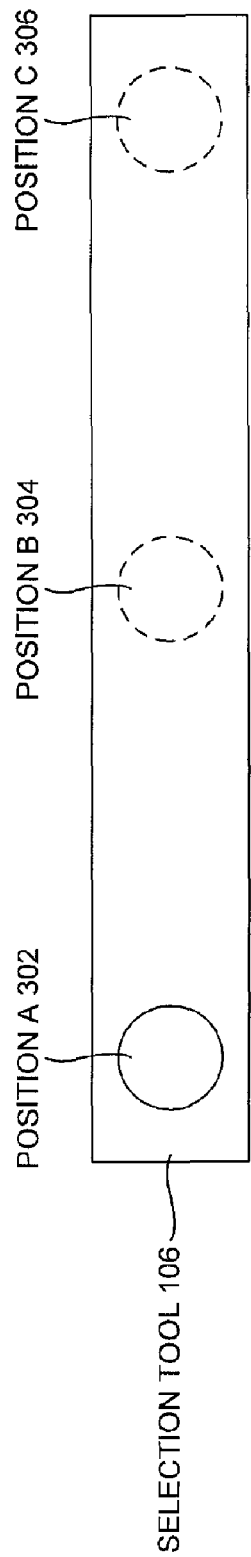
FIG. 3A is a diagrammatic view illustrating a selection tool, according to one embodiment.

FIG. 3A is a diagrammatic view illustrating a selection tool, according to one embodiment.

In one or more embodiments, the selection tool 106 may include an axis to provide the user to select a frequency ratio of a primary song and a secondary song. The user may slide the slider 108 (e.g., as illustrated in FIG. 1) to a desired point along the axis of the selection tool 106. For example, the user may slide the slider 108 to a position A 302, a position B 304, and/or a position C 306 on the axis of the selection tool 106. Based on the position of the slider 108 a frequency ratio of a primary song and a secondary song may be automatically adjusted through a processor and a playlist may be generated.

In an example embodiment, for position A 302, a playlist including 90% primary songs and 10% secondary songs may be generated. For position B 304, a playlist including 50% primary songs and 50% secondary songs may be generated and for position C 306 a playlist including 90% secondary songs and 10% primary songs may be generated.

Figure 3B:
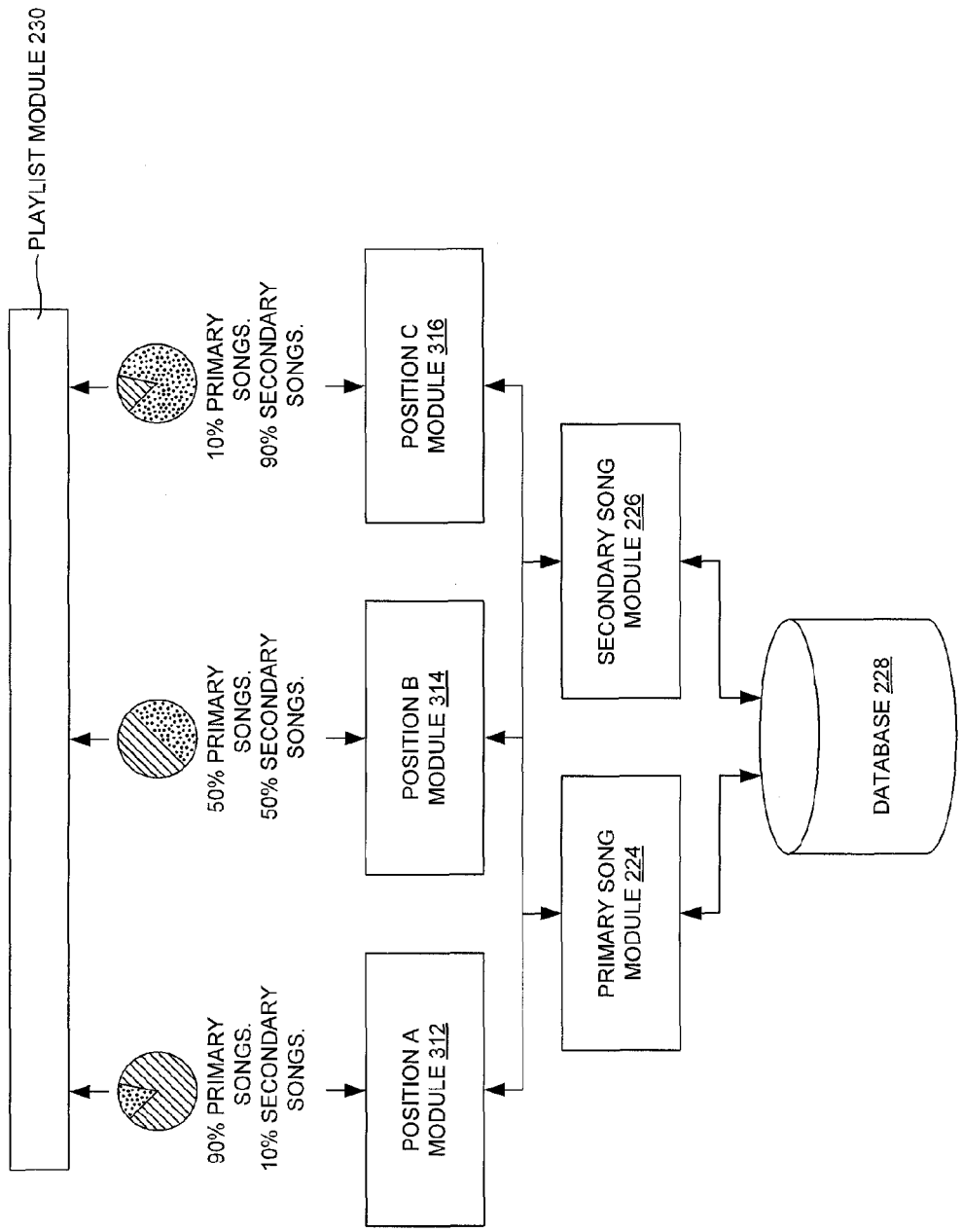
FIG. 3B is a flow diagram illustrating generation of a playlist based on the position of a slider on a selection tool, according to one embodiment.

FIG. 3B is a flow diagram illustrating generation of a playlist based on the position of a slider on a selection tool, according to one embodiment.

In one embodiment, a user may be provided a list of seed data (e.g., seed artist, seed album, seed song, etc.) for selection. Based on the seed data selected by the user, an identity of the primary song in the database 228 may be determined through a processor. The identified primary song in the database 228 may be stored in the primary song module 224. Further, the user may be provided a streaming access to the primary song in the database 228. Based on the primary song a secondary song may be determined and the secondary song similar to the primary song may be identified in the database 228. The identified secondary song in the database 228 may be stored in the secondary song module 226. Further, the user may be provided a streaming access to the secondary song.

A secondary artist of the secondary song may be different from a primary artist of the primary song. A correlation between the primary song and the secondary song may be determined based on an algorithm. The secondary song similar to the primary song may be selected based on a genre of the primary song, a time period of the primary song and/or a tone of the primary song. Furthermore, the user may be provided access to meta-data associated with the secondary song similar to the primary song. The meta-data may be a playlist frequency data, a genre data, an artist history data, an image data, a video data, etc.

In another embodiment, the primary song and the secondary song may be blended according to a frequency ratio provided by the position modules (e.g., a position A module 312, a position B module 314, and/or a position C module 316). The frequency ratio may be selected by sliding the slider 108 to a desired point along a vertical, a diagonal and/or a horizontal axis on the selection tool 106. Based on the position of the slider 108, the position modules (e.g., a position A module 312, a position B module 314, and/or a position C module 316) may evaluate the frequency ratio and blend the primary song and the secondary song according to the frequency ratio. In an example embodiment, for position A 302 (e.g., as illustrated in FIG. 3A) the position A module 312 may evaluate the frequency ratio as 90% primary songs and 10% secondary songs, for position B 304 the position B module 314 may evaluate the frequency ratio as 50% primary songs and 50% secondary songs, and for position C 306 the position C module 316 may evaluate the frequency ratio as 10% primary song and 90% secondary songs.

In yet another embodiment, a play list module 230 may generate a playlist of songs through a processor based on the frequency ratio selected by the user and the generated playlist may be displayed on the music device 100. The playlist 104 may be displayed as a list of songs to be played as a fading gradient of colors from a foreground color to a background color. The fading gradient color of the playlist may create an illusion that the playlist may be infinite.

Figure 4:
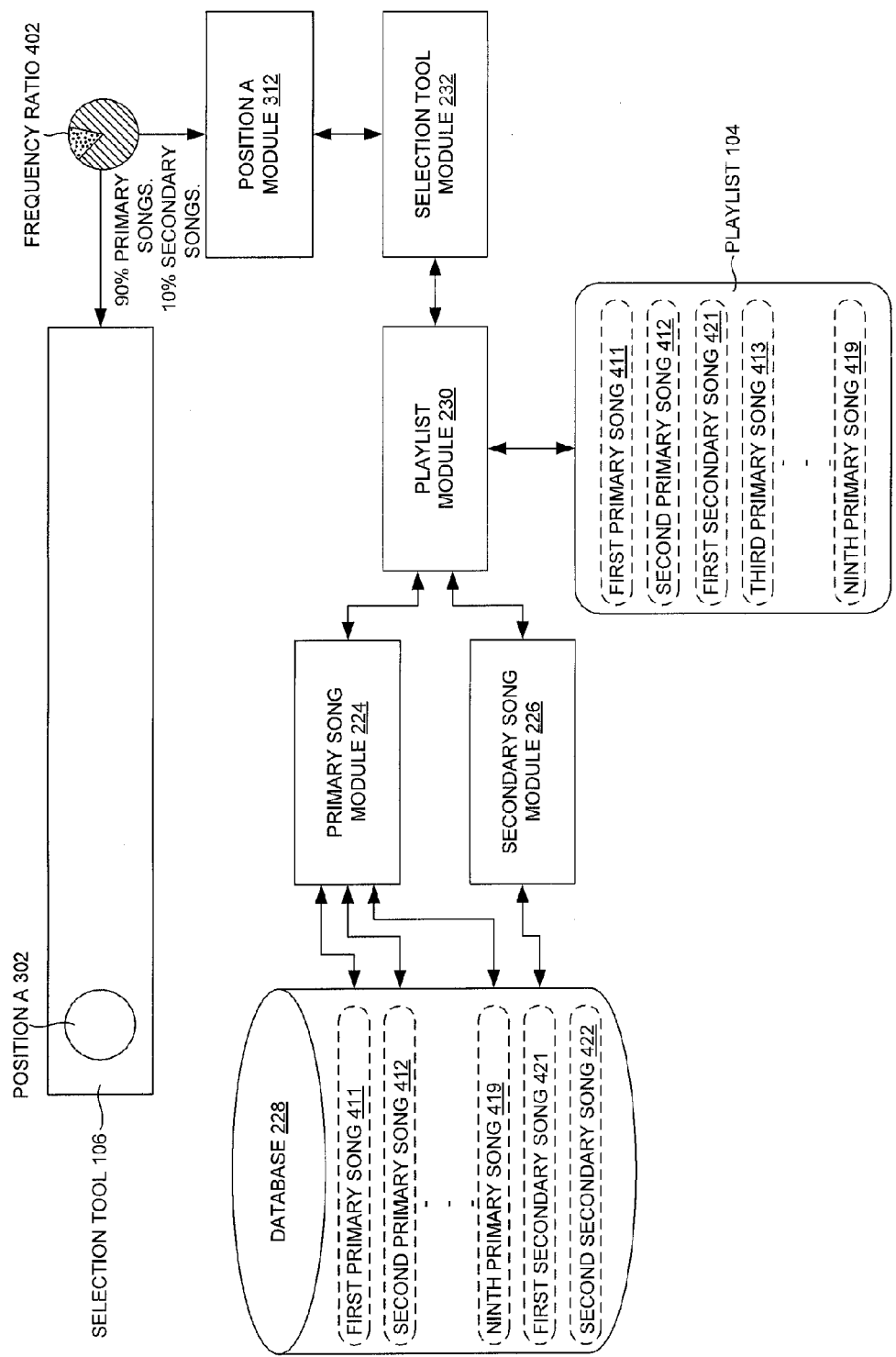
FIG. 4 is a system view illustrating generation of a playlist for a position of slider on the selection tool, according to one embodiment.

FIG. 4 is a system view illustrating generation of a playlist for a position of slider on the selection tool, according to one embodiment.

According to one embodiment, FIG. 4 illustrates generation of a playlist for position A 302 on the selection tool 106. When a user slides the slider 108 to the position A 302 on the selection tool 106 the position A module 312 may provide a frequency ratio 402 for the position A 302 to the selection tool module 232. For example, the frequency ratio 402 for position A 302 may be 90% primary songs and 10% secondary songs. The selection module 232 may provide the frequency ratio of the primary song and the secondary song to the playlist module 230.

Responsive to a selection on the selection tool 106, a frequency ratio of the primary song and the secondary song may be automatically adjusted by the playlist module 230. The primary songs and secondary songs identified in the database 228 may be stored in the primary song module 224 and the secondary song module 226. The play list module 230 may obtain the primary songs from the primary song module 224 and secondary songs from the secondary song module 226. Furthermore, the playlist module 230 may also blend the primary songs and the secondary songs according to the frequency ratio associated with the Position A 302 and generate the playlist 104 through a processor.

In one or more embodiments, a primary artist of the primary song may be the same as the seed artist of the seed data and the secondary artist of the secondary song may be different from the primary artist of the primary song.

FIG. 5 is a table view illustrating frequency of a seed in a playlist, according to one embodiment.

In one embodiment, table 550 may include a column seed 502, a column primary database 504, a column secondary database 506, a column artist name 508, and a column frequency 510. The first column seed 502 may include a list of seed songs (e.g., first primary song, second primary song, etc.), the second column primary database 504 may include a list of primary songs (e.g., X154, X156, etc.), the third column secondary database 506 may include a list of secondary songs (e.g., X155, X165, etc.).

The third column of the table 550, may illustrate artist name 508. The name of the artists in each row of the column artist name 508 may be associated with the songs illustrated in the same row of the columns the seed 502, primary database 504, and/or secondary database 506. For example, an artist name John Doe may be associated with a first primary song, X154, and X155. In another example embodiment, an artist name John Doe may be associated with a secondary song, X156, and X165. The column frequency 510 may illustrate the frequency ratio with which a primary song and secondary song may be blended.

Figure 6:
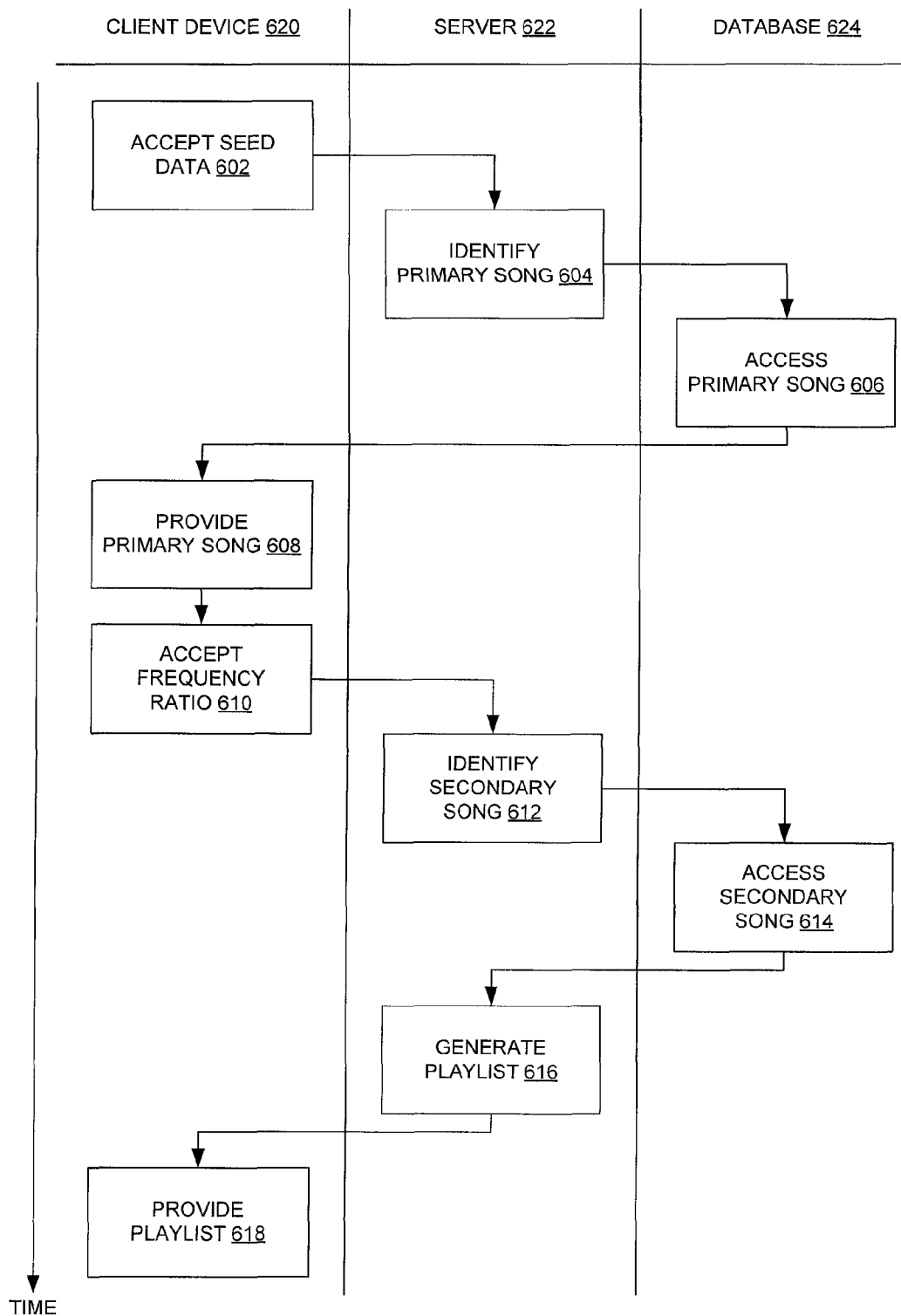
FIG. 6 is a diagrammatic flow diagram illustrating generation of playlist based on input seed and selected frequency, according to one embodiment.

FIG. 6 is a diagrammatic flow diagram illustrating generation of playlist based on input seed and selected frequency, according to one embodiment.

In one or more embodiments, a user may input a seed data and a frequency data through a client device 620 (e.g., a music device 100, the mobile device $200_1$, the radio $200_2$, the automobile radio $200_N$, etc.). In operation 602, the input seed data (e.g., seed artist, seed album, etc.) may be accepted by the client device 620. In operation 622, a server 622 (e.g., music server 204) may identify a primary song associated with the input seed data. In operation 606, the server 622 may access the primary song from a database 624 (e.g., the database 228). In operation 608, the primary song may be provided to the client device 620 through the server 622. In operation 610, a frequency ratio selected by the user may be accepted by the client device 620. In operation 612, a secondary song may be identified by the server 622. The secondary song may be identified based on the primary song and the input frequency ratio. Further, in operation 614, the server 622 may access the secondary song from the database 624. In operation 616, the server 622 may generate a playlist including the primary song and the secondary song. The primary song and the secondary song in the playlist may be blended according to the input frequency ratio. In operation 618, the playlist of songs generated by the server 622 may be provided to the client device 620 to be played.

Figure 7A:
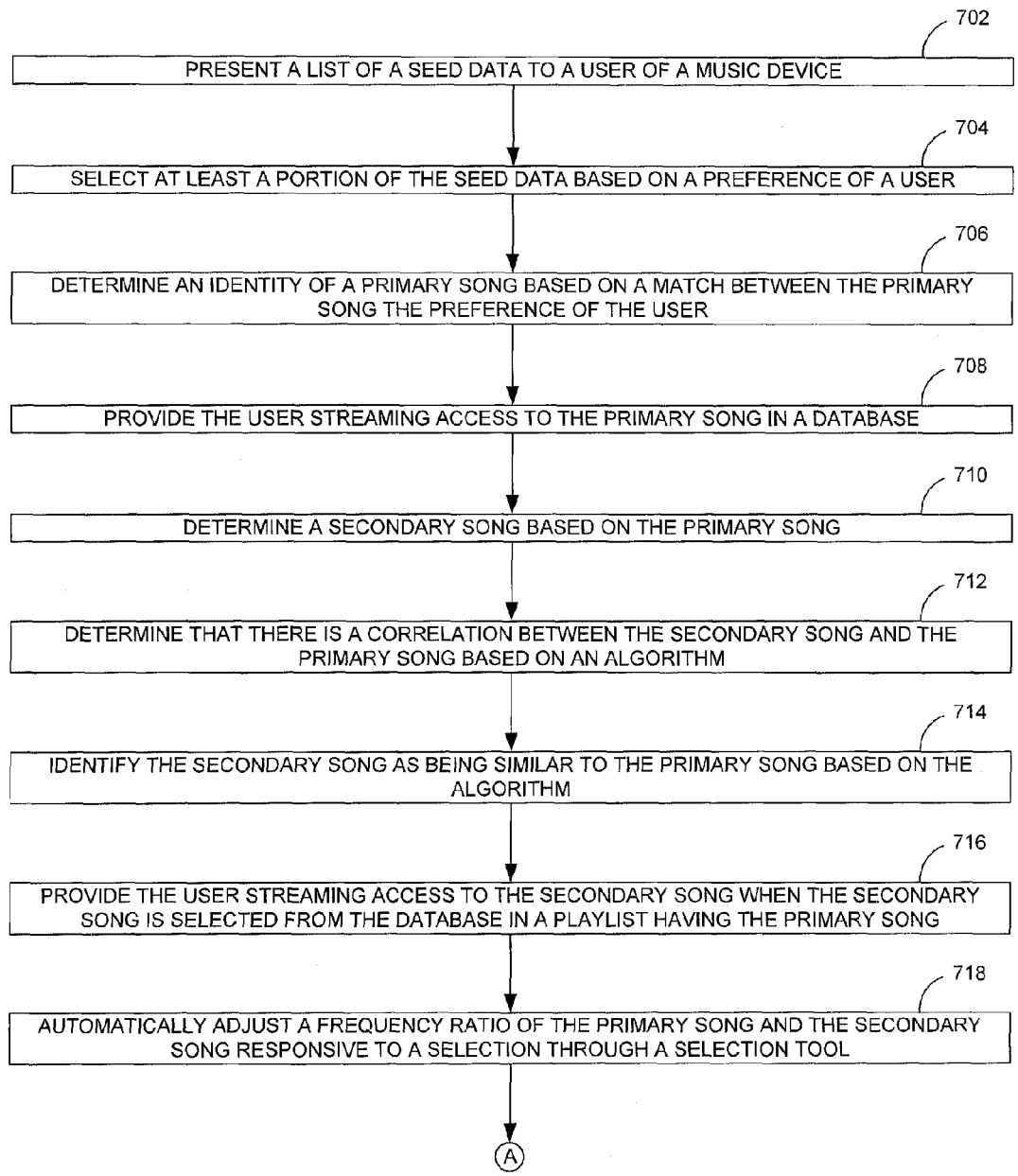
FIG. 7A is a process flow that illustrates generation of a playlist based on a position of a slider on a selection tool, according to one embodiment.

FIG. 7A is a process flow that illustrates generation of a playlist based on a position of a slider on a selection tool, according to one embodiment. In operation 702, a list of a seed data may be presented to a user of a music device (e.g., the music device 100 of FIG. 1). In operation 704, a portion of the seed data may be selected based on a preference of the user. In operation 706, an identity of a primary song may be determined based on a match between the primary song and the preference of the user. In operation 708, the user may be provided a streaming access to the primary song in the database 228.

In operation 710, a secondary song may be determined based on the primary song. A secondary artist of the secondary song may be different than a primary artist of the primary song. In operation 712, a correlation between the secondary song and the primary song may be determined based on an algorithm. In operation 714, the secondary song may be identified as being similar to the primary song based on the algorithm. In operation 716, the user may be provided a streaming access to the secondary song when the secondary song is selected from the database 228 in a playlist having the primary song. In operation 718, a frequency ratio of the primary song and the secondary song may be automatically adjusted responsive to a selection through the selection tool 106.

Figure 7B:
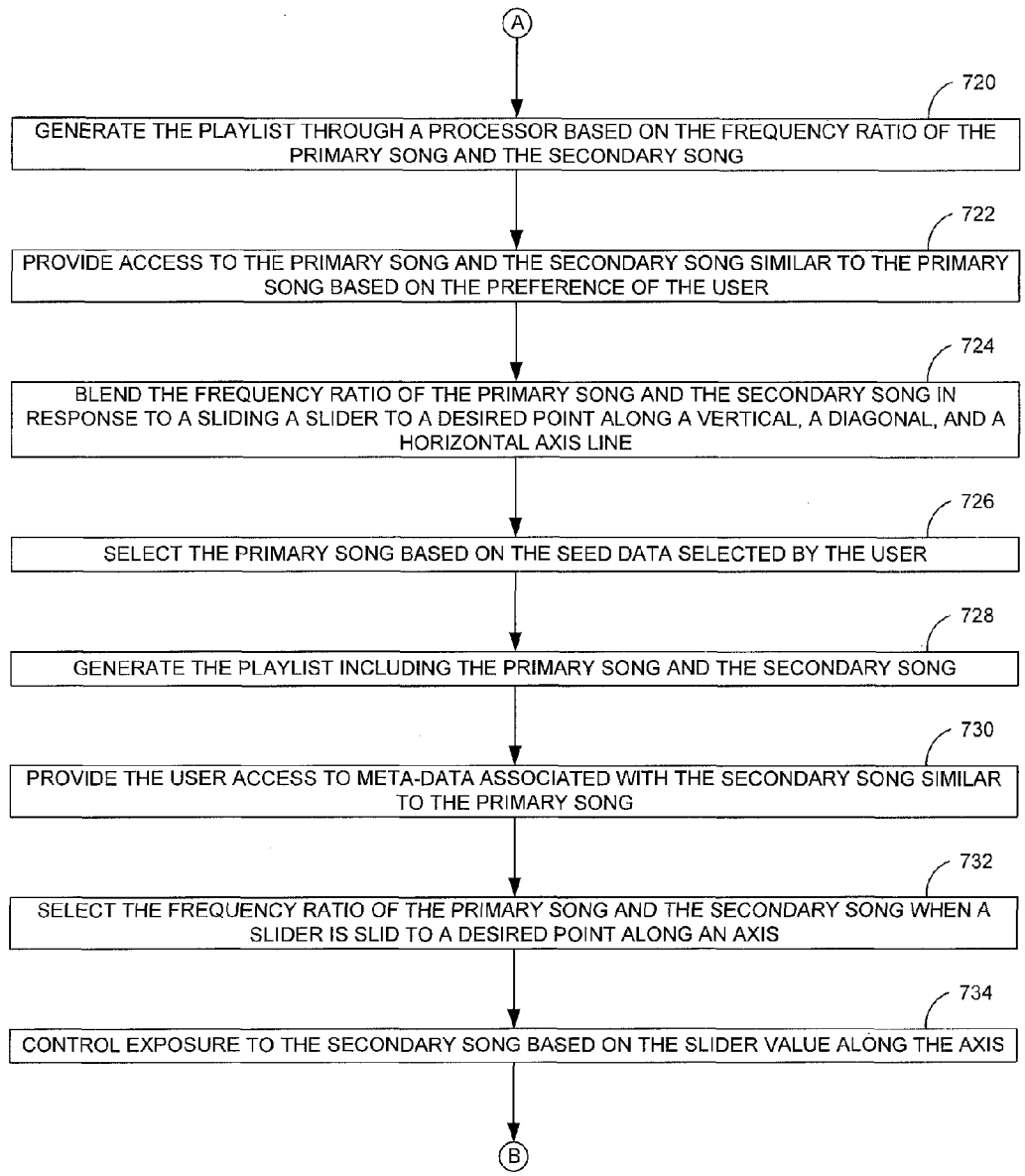
FIG. 7B is a continuation of the process flow illustrated in FIG. 7A, according to one embodiment.

FIG. 7B is a continuation of the process flow illustrated in FIG. 7A, according to one embodiment.

In operation 720, the playlist may be generated through a processor based on the frequency ratio of the primary song and the secondary song. In operation 722, access to the primary song and the secondary song similar to the primary song may be provided based on the preference of the user. In operation 724, the frequency ratio of the primary song and the secondary song may be blended in response to a sliding of the slider 108 to a desired point along a vertical, a diagonal, and/or a horizontal axis line. In operation 726, the primary song may be selected based on the seed data selected by the user. For example, the seed data may be one of a seed artist, a seed album, and/or a seed song.

In operation 728, the playlist 104 including the primary song and the secondary song may be generated. For example, the playlist 104 may be generated using the playlist module 230. The primary artist of the primary song may be same as the seed artist of the seed data and the secondary artist of the secondary song may be different than the primary artist of the primary song. In operation 730, the user may be provided access to meta-data associated with the secondary song similar to the primary song. The meta-data may be a playlist frequency data, a genre data, an artist history data, an image, and/or a video data. In operation 732, the frequency ratio of the primary song and the secondary song may be selected when the slider 108 is slid to a desired point along an axis. In operation 734, exposure to the secondary song may be controlled based on the slider value along the axis.

Figure 7C:
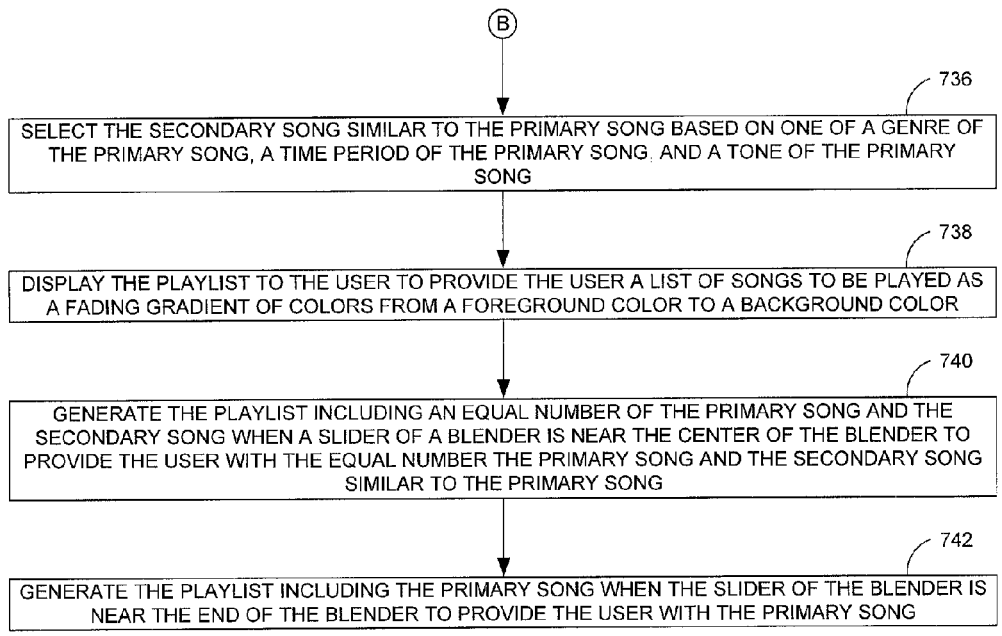
FIG. 7C is a continuation of the process flow illustrated in FIG. 7B, according to one embodiment.

FIG. 7C is a continuation of the process flow illustrated in FIG. 7B, according to one embodiment.

In operation 736, the secondary song similar to the primary song may be selected based on one of a genre of the primary song, a time period of the primary song, and/or a tone of the primary song. In operation 738, the playlist 104 may be displayed to provide the user a list of songs to be played as a fading gradient of colors from a foreground color to a background color, thereby creating an illusion that the playlist is infinite. In operation 740, a playlist including an equal number of the primary song and the secondary song may be generated when the slider 108 of a blender is near the center of the blender to provide the user with the equal number the primary song and the secondary song similar to the primary song. In operation 742, the playlist 104 including the primary song may be generated when the slider 108 of the blender is near the end of the blender to provide the user with the primary song. The primary artist of the primary song may be same as a seed artist of the seed.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software or any combination of hardware, firmware, or software (e.g., embodied in a machine readable medium). For example, the various electrical structure and methods may be embodied using transistors, logic gates, and electrical circuits (e.g., application specific integrated (ASIC) circuitry or in Digital Signal Processor (DSP) circuitry).

In addition, it will be appreciated that the various operations, processes, and methods disclosed herein may be embodied in a machine-readable medium or a machine accessible medium compatible with a data processing system (e.g., a computer system), and may be performed in any order (e.g., including using means for achieving the various operations).

Accordingly, the Specification and Drawings are to be regarded in an illustrative rather than a restrictive sense.

What is claimed is:

1. A method comprising:
    inputting seed data, through a user interface of a music device, based on a preference of a user of the music device;
    determining, through a music server, an identity of a number of primary songs based on a match between the number of primary songs and the preference of the user;
    providing, through the music server, the user streaming access to the primary songs in a database of the music server;
    determining, through the music server, a number of secondary songs based on the number of primary songs, wherein a secondary artist of a secondary song is different than a primary artist of a primary song;
    determining, through the music server, that there is a correlation between a secondary song and a primary song based on an algorithm;
    identifying, through the music server, the secondary song as being similar to the primary song based on the algorithm;
    providing, through the music server, the user streaming access to the number of secondary songs when a secondary song is selected from the database in a playlist having the number of primary songs;
    automatically adjusting, through the music server, a frequency ratio of the primary songs and the secondary songs responsive to a selection through a selection tool;
    generating the playlist through a processor based on the frequency ratio of the number of primary songs and the secondary songs;
    providing access, through the music server, to the number of primary songs and the number of secondary songs similar to the primary song based on the preference of the user; and
    displaying the playlist to the user to provide the user a list of songs to be played as a fading gradient of colors from a foreground color to a background color, thereby creating an illusion that the playlist is infinite.

2. The method of claim 1, further comprising blending the frequency ratio of the primary songs and the secondary songs in response to a sliding a slider to a desired point along at least one of a vertical, a diagonal, and a horizontal axis line.

3. The method of claim 1, further comprising selecting a primary song based on the seed data selected by the user, wherein the seed data is one of a seed artist, a seed album, and a seed song, to provide the user a control of the number of primary songs.

4. The method of claim 1, further comprising:
    generating the playlist comprising the primary songs and the secondary songs, wherein a primary artist of the primary songs is the same as the seed artist of the seed data and a secondary artist of a secondary song is different than the primary artist of the primary songs; and
    providing the user access to meta-data associated with the secondary songs similar to the primary songs, wherein the meta-data is at least one of a playlist frequency data, a genre data, an artist history data, an image, and a video data.

5. The method of claim 1, comprising:
    selecting the frequency ratio of the primary songs and the secondary songs when a slider is slid to a desired point along an axis; and
    controlling exposure to the secondary songs based on the slider value along the axis.

6. The method of claim 1, further comprising selecting the secondary songs similar to the primary songs based on one of a genre of the primary songs, a time period of the primary songs, and a tone of the primary songs.

7. The method of claim 1, comprising communicating between the music device and the music server through a computer network.

8. The method of claim 1, comprising:
    generating the playlist comprising an equal number of the primary songs and the secondary songs when a slider of a blender is near the center of the blender to provide the user with the equal number of the primary songs and the secondary songs similar to the primary songs, wherein the blender comprises the axis responsive to adjusting the frequency ratio.

9. The method of claim 8, comprising generating the playlist comprising the primary songs when the slider of the blender is near the end of the blender to provide the user with the primary songs, with the primary artist of the primary songs being the same as a seed artist of the seed, to provide the user streaming access to the primary songs of the seed artist of the seed data.

10. A method comprising:
    providing, through a server device, streaming access to a first primary song to a user of a music device;
    determining, through the server device, an identity of a second primary song, wherein a primary artist of the first primary song is the same as the primary artist of the second primary song;
    providing, through the server device, the user streaming access to the second primary song in a database of the server device;
    determining, through the server device, a secondary song based on the first primary song, wherein a secondary artist of the secondary song is different than the primary artist of the first primary song;
    determining, through the server device, that there is a correlation between the secondary song and the first primary song based on an algorithm;
    identifying, through the server device, the secondary song as being similar to the first primary song based on the algorithm;
    providing, through the server device, the user streaming access to the secondary song when the secondary song is selected from the database in a playlist having the first primary song;
    automatically, through the server device, adjusting a frequency ratio of primary songs and secondary songs in the playlist responsive to a selection through a selection tool by the user;
    generating, through the server device, the playlist through a processor based on the frequency ratio of the primary songs and the secondary songs;
    providing access to the primary songs and the secondary songs similar to the primary song; and
    displaying the playlist to the user to provide the user a list of songs to be played as a fading gradient of colors from a foreground color to a background color, thereby creating an illusion that the playlist is infinite.

11. The method of claim 10, further comprising blending the frequency ratio of the primary songs and the secondary songs in response to a sliding a slider to a desired point along at least one of a vertical, a diagonal, and a horizontal axis line.

12. The method of claim 10, further comprising selecting the frequency ratio of the primary songs and the secondary songs when a slider is slid to a desired point along an axis; controlling exposure to the secondary song based on the slider value along the axis.

13. The method of claim 10, further comprising selecting the secondary songs similar to the primary songs based on the algorithm comprising an analysis of a genre of the primary songs and the genre of the secondary songs.

14. The method of claim 10, comprising communicating between the music device and the server device through a computer network.

15. The method of claim 10, further comprising generating the playlist comprising an equal number of the primary songs and the secondary songs when a slider of a blender is near the center of the blender to provide the user with the equal number of the primary songs and the secondary songs similar to the primary songs, wherein the blender comprises the axis responsive to adjusting the frequency ratio.

16. A system comprising:
   a music device to enable a user thereof to input seed data through a user interface based on a preference of the user; and
   a music server communicatively coupled to the music device to:
      determine an identity of a number of primary songs based on a match between the number of primary songs and the preference of the user,
      provide the user streaming access to the primary songs in a database thereof,
      determine a number of secondary songs based on the number of primary songs, wherein a secondary artist of a secondary song is different than a primary artist of a primary song,
      determine that there is a correlation between a secondary song and a primary song based on an algorithm,
      identify the secondary song as being similar to the primary song based on the algorithm,
      provide the user streaming access to the number of secondary songs when a secondary song is selected from the database in a playlist having the number of primary songs,
      automatically adjust a frequency ratio of the primary songs and the secondary songs responsive to a selection through a selection tool,
      generate the playlist through a processor based on the frequency ratio of the number of primary songs and the secondary songs,
      provide access to the number of primary songs and the number of secondary songs similar to the primary song based on the preference of the user, and
      display the playlist to the user to provide the user a list of songs to be played as a fading gradient of colors from a foreground color to a background color, thereby creating an illusion that the playlist is infinite.

17. The system of claim 16, wherein the processor is configured to select the primary songs based on the seed data selected by the user, wherein the seed data is one of a seed artist, a seed album, and a seed song, to provide the user a control of the primary songs.

18. The system of claim 16, wherein the processor is configured to provide the user access to meta-data associated with the secondary songs similar to the primary songs, wherein the meta-data is at least one of a playlist frequency data, a genre data, an artist history data, an image, and a video data.

19. The system of claim 16, wherein the processor is configured to select the frequency ratio of the primary songs and the secondary songs when a slider is slid to a desired point along an axis, and to control exposure to the secondary songs based on a slider value along the axis.

20. The system of claim 16, wherein the processor is configured to select the secondary songs similar to the primary songs based on one of a genre of the primary songs, a time period of the primary songs, and a tone of the primary songs.

* * * * *